Patented June 25, 1940

2,205,503

UNITED STATES PATENT OFFICE 2,205,503

CONCENTRATION OF COMMINUTED MATERIALS FROM THEIR MIXTURES

William Trotter, Forest Hills, N. Y., and Eltoft Wray Wilkinson, Berkeley, Calif., assignors to Minerals Separation North American Corporation, New York, N. Y., a corporation of Maryland No Drawing. Application February 25, 1939, Serial No. 258,462

25 Claims. (Cl. 209—166)

The present invention relates to the art of concentrating comminuted materials from their mixtures by such methods as flotation and agglomeration.

The concentrating procedures of the invention are carried out with organic-substituted isourea compounds of the type having an aliphatic or aromatic hydrocarbon group attached to oxygen as their substituent. We have discovered that such compounds are extremely valuable reagents in this art, a wide variety of separations being possible by their use. While aromatic-substituted compounds are included among these reagents, the aliphatic-substituted compounds have been found most useful.

Minerals of either metallic or non-metallic character can be effectively and economically concentrated by the invention, which may also be advantageously applied to the separation of artificially produced substances, such as glass and resin. Among the many minerals which may be concentrated from their ores by this invention are included sulphides, oxides, carbonates, fluorides, phosphates, silicates, etc., a particularly important aspect of the invention residing in the separation of silica from phosphate ores.

The compounds made use of by the invention are additive products of organic hydroxy compounds with cyanamide ($N{:}C.NH_2$). As we have found, such products are capable of use in our process with or without further combination with acids substantially soluble in water, such as hydrochloric acid, sulphuric acid, acetic acid, etc. When uncombined with acid, they consist of organic-substituted isoureas of the general formula $H_2N.C(OR){:}NH$. When combined with acid, they consist of organic-substituted isourea salts of the general formula $$[H_2N.C(OR){:}NH.H]_nX$$

In each of these two formulae, the symbol R has reference to the hydrocarbon residue of an organic hydroxy compound, the symbol X and multiplier $n$ of the second formula respectively appertaining to the anion of a substantially water-soluble acid and to a whole number equal to the valence of the acid anion X.

In general, the compounds useful in the process of the invention may be produced economically by reacting together two molecular proportions of the desired alcohols with one molecular proportion each of cyanamide and of cyanamide dihydrochloride, with careful heating. Where the reaction is properly executed, it has been found  to yield the substituted isourea compounds desired in the form of hydrochlorides. If desired, these may then be treated with a suitable base, such as caustic soda, to give the isoureas themselves.

A more direct method, of course, of producing the compounds used by the invention is to react the alcohols desired with cyanamide monohydrochloride, but we do not consider this method as practicable as the quite analogous method above described, because of the difficulty of obtaining cyanamide mono-hydrochloride.

While certain related methods of preparation have been described, it is understood that there is none to which the compounds useful in practicing the invention are restricted. Moreover, the use of reaction products in purified form is not at all required, it being enough that the crude reaction mixtures obtained contain a substantial amount of the compounds desired to render them useful reagents in this art. In this connection it may also be noted that the starting materials themselves need not be pure materials. Commercial mixtures of alcohols may thus be used, the mixed compounds contained in the reagents produced in these cases sometimes making them more useful than those produced with single alcohols.

The compounds used in practicing the invention are generally soluble in alcohol and in water, but more so in the former than in the latter. Moreover, there is a tendency for their solubility to become less, in either of these solvents, as the size of the molecule increases. On the other hand, their effectiveness in the process does not seem to depend on the solvent used. True solution is by no means essential, as a fine suspension has been found quite satisfactory.

It is impossible to assign any single function to the reagents of the invention, whose properties have a certain variety adapting them for use in various ways in this art. They are not, of course, equally useful for all purposes, one factor determining their effectiveness in any particular instance of use being the number of carbon atoms of their contained compounds.

In general, the higher compounds are more effective collectors than the lower compounds, while the lower compounds are more effective frothers than the higher compounds. Consequently, where one of the higher compounds may be used to bring up a heavy float, it may be desirable to use along with it one of the lower compounds to strengthen the frothing condition. On the other hand, the lower compounds are selective, even when they lack high collecting power in themselves. Consequently, whereas the higher compounds may be used in preference to the lower compounds where high recoveries are to be obtained, the lower compounds may sometimes be more suitable than the higher compounds where cleaner concentrates are required.

It is also important to note that the reagents of the invention have the property of cooperating in the well-known manner with non-frothing water-immiscible organic liquids, such as fuel oil, this property being of particular value in connection with the lower compounds, in view of their lower collecting capability. There seems to be neither a lower nor an upper carbon limit at which the reagents of the invention cease to be of use in one way or another in this art.

The experienced operator will understand, of course, that there can be no definite rule governing reagent choice, which would apply to all cases of separation in practice. There is so much difference between the reagent responses of different minerals due to their peculiar surface properties, their specific surface area, etc., that one mineral may be found easy to float with, say, our nonyl alcohol reaction product, while another may require, say, the cetyl or oleyl alcohol derivatives, or even the aid of other agents, such as oil, etc. By the usual preliminary tests, however, the experienced operator can readily determine the reagent best suited for his particular problem, as well as the best conditions of its use.

The reagents of the invention have been found satisfactory in neutral, alkaline, and acid circuits. In some cases, however, different effects may be obtained depending on the type of circuit employed. In treating a certain kyanite ore, for instance, it was noted that acid promoted flotation of the kyanite with rejection of the silica, while the reverse effect was true in a neutral circuit. The aforementioned preliminary tests may thus include some on the type of circuit to be used for the particular separation contemplated.

It is very frequently advantageous to largely deslime the ore prior to its treatment by our invention, though in some cases inclusion of the slimes has not prevented the realization of useful results.

The reagents of the invention seem to give their effects very rapidly upon their addition to the ore, which may be admixed with such agents, together with any others that may be used to cooperate with such agents, in the form of a pulp of suitable consistency. It may sometimes be advantageous to condition the ore in the form of a thick pulp, which particularly applies to cases where the reagents of the invention are employed along with oily or not easily miscible liquids. But in any case a prolonged period of reagent admixture is generally unnecessary.

The concentrating step of the invention may be carried out in any apparatus capable of discharging the selected minerals in such states as floating froth, skin or surface float, individual agglomerates, etc., such apparatus being well known and obviously requiring no description herein.

A number of examples are described below for the purpose of guiding the experienced operator in the various uses of the reagents of this invention. As will be noted, there are, in effect, two distinct groups of these examples; one (dealing with a fairly wide variety of treated materials) being intended to illustrate the great versatility of the reagents of the invention; and the other (largely dealing with phosphate ore) being intended to provide comparisons between different specimens of such reagents. From the various examples following it will be apparent that the process of the present invention is one according to which either the desired or undesired fraction of the ore is selectively concentrated out of the pulp, e. g., as in the form of a froth, under the influence of the reagents used, so that either one of the two products obtained in any instance of separation may constitute the concentrate desired. For convenience in reporting the results, however, the term "concentrate" will be used in all instances to refer strictly to the fraction separated in such forms as floating froth, skin or surface float, individual agglomerates, etc., regardless as to whether it was the desired fraction, while the term "tailing" will be in used in all instances to refer strictly to the other fraction, regardless as to whether it was the undesired fraction. Where middlings are reported it is understood that this applies to products of intermediate value (usually obtained in connection with operations of retreatment), many of which in practice would be returned to the circuit at an appropriate point so as to discharge part of their contents in the desired end product and the remaining part in the final waste material. In connection with the examples as a whole, it should further be noted that the reagents of the invention were, unless otherwise specified, crude reaction mixtures corresponding to the compounds mentioned. In the usual manner, of course, the various reagent proportions indicated are expressed in pounds per ton (2000 lbs.) of dry material treated.

*Example 1*

A sample of Florida pebble phosphate ore, of a particle size to pass 35-mesh, was substantially deslimed and, in the form of a thick pulp, stirred for a few seconds in a Minerals Separation subaeration flotation machine with 0.22 lb. of O-dodecyl isourea per ton of ore. The pulp was diluted, air admitted, and a heavy freely-flowing froth of silica collected in a comparatively short time. After the tailing was removed from the machine, this silica float was re-treated, without further reagent addition, to give a finished float concentrate of silica, the residue in the machine by this operation constituting a middling, which in practice would be returned to the flotation cells for further treatment with fresh feed. The results of the test are indicated in the following table:

|      | Percent weight | Percent B. P. L. | Percent ins. | Percent distribution of B. P. L. |
|------|---------------|------------------|--------------|----------------------------------|
| Head | 100.0         | 24.85            |              | 100.0                            |
| Conc | 66.7          | 0.8              | 98.5         | 2.1                              |
| Midd | 1.2           | 62.5             | 25.6         | 3.0                              |
| Tail | 32.1          | 73.4             | 12.8         | 94.9                             |

B. P. L. is the common abbreviation for bone phosphate of lime (tribasic calcium phosphate).

*Example 2*

Another test was made on another sample of the same phosphate ore with the sole difference that the amount of O-dodecyl isourea was increased to 0.43 lb. per ton of ore, the results in this instance being as follows:

|  | Percent weight | Percent B. P. L. | Percent ins. | Percent distribution of B. P. L. |
|---|---|---|---|---|
| Head | 100.0 | 26.14 |  | 100.0 |
| Conc | 71.3 | 2.1 | 97.0 | 6.0 |
| Midd | 2.4 | 77.6 | 10.2 | 7.4 |
| Tail | 26.3 | 82.6 | 1.8 | 86.6 |

The excellence of these results is apparent from the fact that the phosphate mineral contained in the sample used in this test could not have been concentrated any higher than 84.2%, without recourse to chemical means.

Example 3

A sample of silicious fluorite ore was ground to pass 65-mesh and thereafter deslimed. In the form of an aqueous pulp acidulated with sulphuric acid at the rate of 5 lbs. per ton of ore, it was then treated in a Minerals Separation subaeration flotation machine in the presence of 7 lbs. of O-cetyl isourea hydrochloride, also per ton of ore, a rougher concentrate richer in calcium fluoride than in silica being floated off as a froth. Retreatment of this floated material in the same machine, first with no further reagent addition and thereafter with 1 lb. more of the same hydrochloride reagent per ton of original ore, yielded the first and second concentrates of the table below, respectively, the middling being the final residue left in the machine:

|  | Percent weight | Percent $SiO_2$ | Percent $CaF_2$ | Percent distribution of $CaF_2$ |
|---|---|---|---|---|
| Head | 100.0 | 15.25 | 84.75 | 100.0 |
| 1st conc | 61.3 | 3.7 | 96.3 | 69.7 |
| 2nd conc | 9.0 | 7.1 | 92.9 | 9.8 |
| Midd | 8.4 | 23.4 | 76.6 | 7.6 |
| Tail | 21.3 | 48.5 | 51.5 | 12.9 |

Example 4

The reagent of the invention was one obtained with the material commercially known as "Lorol," an alcoholic mixture consisting largely of lauryl alcohol. This material was slowly heated with cyanamide and cyanamide di-hydrochloride to 70° C. The reaction mass was then kept warm for about two hours, when it was found to be nearly homogeneous. Subsequently it was dissolved in ordinary alcohol so as to produce a 4% solution, in which state it was used as follows:

A sample of zinc ore from the Tri-State field was ground to pass 65-mesh and, after removal of the finest slimes, was transferred to a Minerals Separation subaeration flotation machine where, in a circuit made alkaline with 6 lbs. of caustic soda per ton of ore, it was treated for the production of two concentrates by the addition of two successive amounts of the alcohol solution, each, corresponding to 0.8 lb. of the "Lorol" reaction product dissolved therein per ton of ore, the second concentrate consisting largely of film-floating coarse pieces of blende. The following results were obtained:

|  | Percent weight | Percent Pb | Percent Zn | Percent Ins. | Percent distribution | |
|---|---|---|---|---|---|---|
|  |  |  |  |  | Pb | Zn |
| Head | 100.0 | 0.82 | 5.46 |  | 100.0 | 100.0 |
| 1st conc | 8.56 | 8.57 | 55.14 | 5.9 | 89.7 | 86.4 |
| 2nd conc | 1.01 | 8.36 | 38.10 | 19.7 | 10.3 | 7.0 |
| Tail | 90.43 | Trace | 0.40 |  |  | 6.6 |

Example 5

Another test on the same Tri-State zinc ore was made in a neutral circuit, each of the two concentrates being in this instance produced with the alcohol solution employed in amount corresponding to 0.4 lb. of the dissolved "Lorol" reaction product per ton of ore. While these concentrates were not as good as those of Example 4, they could have been improved by retreatment to commercial grade.

|  | Percent weight | Percent Zn | Percent distribution of Zn |
|---|---|---|---|
| Head | 100.0 | 5.32 | 100.0 |
| 1st conc | 10.2 | 42.36 | 81.1 |
| 2nd conc | 7.7 | 10.28 | 14.7 |
| Tail | 82.1 | 0.28 | 4.2 |

Example 6

A sample of high grade dolomite was ground to pass a 65-mesh screen and treated by flotation to leave a tailing low in insolubles, mostly silica. Two concentrates were produced, in each instance, by employing O-dodecyl isourea hydrochloride in the form of a 4% alcoholic solution. The amount of the dissolved reagent for the first concentrate was 0.3 lb. per ton of ore, while for the second concentrate 0.4 lb. per ton of ore was used.

|  | Percent weight | Percent ins. |
|---|---|---|
| Head | 100.0 | 3.38 |
| 1st conc | 9.6 | 19.1 |
| 2nd conc | 16.9 | 4.8 |
| Tail | 73.5 | 1.0 |

Example 7

A sample of classifier overflow from the Valley Forge Cement Company was treated to give a tailing rich in solubles (limestone), by largely floating off the insolubles (silicious matter). A rougher concentrate of high insoluble content was first produced by treating the sample in a Minerals Separation subaeration flotation machine in the presence of 0.5 lb. of O-dodecyl isourea hydrochloride (per ton of feed) in the form of a 4% alcoholic solution. With the tailing of solubles removed, the rougher concentrate was then returned to the same machine and retreated once, without further reagent addition, to produce a final concentrate of higher insoluble content and a middling.

|  | Percent weight | Percent ins. | Percent sols. | Percent distribution | |
|---|---|---|---|---|---|
|  |  |  |  | Ins. | Sols. |
| Head | 100.0 | 22.1 | 77.9 | 100.0 | 100.0 |
| Conc | 33.8 | 58.9 | 41.1 | 90.2 | 17.7 |
| Midd | 17.5 | 9.1 | 90.9 | 7.2 | 20.4 |
| Tail | 48.7 | 1.2 | 98.8 | 2.6 | 61.9 |

Example 8

A reagent was here produced by reacting cyanamide and cyanamide di-hydrochloride with "Ocenol," a material consisting largely of oleyl alcohol. The same heating procedure was employed in producing this reagent as described in connection with the reagent of Example 4. In the same manner, it was subsequently dissolved in ordinary alcohol, the following test being carried out with this solution:

The minus 35-mesh portion of a jig concentrate containing zircon with iron oxides as magnetite and hematite was treated in a Minerals Separation subaeration flotation machine with an amount of the alcohol solution corresponding to 0.6 lb. of the dissolved "Ocenol" reaction product per ton of ore to give a rough concentrate carrying a large proportion of the zircon. Thereafter, another concentrate not as clean as the first was taken off with a further amount of the alcohol solution corresponding to 0.4 lb. of the dissolved "Ocenol" reaction product per ton of ore. After the tailing was removed from the machine, retreatment of the latter concentrate was carried out, without further reagent addition, to give a small cleaner concentrate, which was added to the concentrate initially obtained. The tailing of this cleaning operation constituted a first middling and was removed from the machine, after which the material of the two concentrates combined was further treated, without further reagent addition, to produce a finished concentrate, the tailing of this last operation constituting a second middling. The results of this test were as follows:

|  | Percent weight | Percent zircon | Percent distribution of zircon |
|---|---|---|---|
| Head | 100.0 | 69.2 | 100.0 |
| Conc | 58.6 | 88.5 | 74.8 |
| 1st midd | 6.2 | 72.2 | 6.5 |
| 2nd midd | 12.4 | 49.5 | 11.1 |
| Tail | 22.8 | 23.1 | 8.6 |

The increased recovery obtainable in commercial operations by return of the middlings at an appropriate point of the circuit is apparent from this table.

Example 9

General Naval Stores steam distilled pine oil was further distilled to give a fraction boiling between 210° and 215° C. at atmospheric pressure. With 5.34 grams of this fraction, consisting substantially of terpineol, were mixed 0.73 gram of cyanamide and 2.0 grams of cyanamide dihydrochloride, the mixture being kept at about 70° C. for eight hours. The reaction did not proceed under these conditions to a homogeneous product, but it was evident that quite a considerable amount of a reaction compound believed to be O-terpinyl isourea hydrochloride had been formed. About 27% of the reaction mass consisted of a brown rather viscous liquid, the remaining 73% consisting of white solids, which were separated by draining off the liquid portion.

The white solid portion in the form of a 4% alcoholic solution was used at the rate of 5 lbs. per ton of ore to treat a sample of minus 35-mesh deslimed Florida phosphate ore by flotation with the following results:

|  | Percent weight | Percent B. P. L. | Percent ins. | Percent distribution of B. P. L. |
|---|---|---|---|---|
| Head | 100.0 | 27.7 |  | 100.0 |
| Conc | 44.9 | 2.7 | 96.2 | 4.4 |
| Tail | 55.1 | 48.1 | 43.2 | 95.6 |

Almost identical results were obtained when using the brown liquid portion (without being put into solution before use).

Example 10

A sample of kyanite ore from Baker Mountain, Virginia, was crushed to pass 35-mesh and substantially deslimed. Thereafter, in the form of a dilute pulp (approximately 4 parts of water to one of ore) acidified with sulphuric acid at the rate of about 3 lbs. per ton of ore, it was treated in a Minerals Separation flotation machine of the Wilkinson & Littleford type with an amount of the alcoholic solution of Example 8 corresponding to 5 lbs. of the "Ocenol" reaction product dissolved therein per ton of ore. A very strong heavy froth rich in kyanite was obtained, which was cleaned four times in the same machine, in each instance with no further reagent addition, the four middlings obtained by these cleaning operations being combined into two products as indicated in the following table:

|  | Percent weight | Percent kyanite | Percent distribution of kyanite |
|---|---|---|---|
| Head | 100.0 | 36.1 | 100.0 |
| Conc | 31.2 | 88.0 | 76.1 |
| 3rd and 4th midds | 5.0 | 51.8 | 7.2 |
| 1st and 2nd midds | 17.5 | 15.3 | 7.4 |
| Tail | 46.3 | 7.3 | 9.3 |

Good results were also obtained on this kyanite ore without desliming, though rather less reagent was required when the finest slimes were removed.

Example 11

Another sample of the same kyanite ore was in this instance processed for kyanite concentration by initially floating off a large portion of its silicious constituent. This sample was of a particle size ranging from minus 28 to plus 48-mesh and was found to be too coarse to give the best results by flotation. Nevertheless, the test affords a good illustration of the uses of the invention as applied to kyanite concentration.

The sample was first treated in a neutral circuit wtih 10.2 lbs. of O-nonyl isourea hydrochloride per ton of ore. A froth rich in silica was removed and cleaned once to give a final concentrate of silica. The residue of this cleaning operation is recorded below as a first middling, another float recorded as a second middling being made by treating the residue of the first operation with a further 3.9 lbs. of the same hydrochloride reagent per ton of ore.

At this stage the residue was relatively rich in kyanite and no more silica could be removed without further reagent addition. This residue was acidified with sulphuric acid, with the result that the kyanite was found to float in preference to the silica. The frothing condition was fortified by the addition of an amount of the alcohol solution of Example 8 corresponding to 1.3 lbs. of the dissolved "Ocenol" reaction product per ton of original ore, an excellent froth constituting the kyanite concentrate being taken off.

The results of the test were as follows:

|  | Percent weight | Percent kyanite | Percent distribution of kyanite |
|---|---|---|---|
| Head | 100.0 | 33.9 | 100.0 |
| Silica conc | 43.2 | 7.3 | 9.3 |
| 1st midd | 11.2 | 16.0 | 5.3 |
| 2nd midd | 14.4 | 34.1 | 14.5 |
| Kyanite conc | 24.0 | 92.2 | 65.2 |
| Final residue | 7.2 | 26.3 | 5.7 |

The specific gravity of the kyanite concentrate containing 92.2% of this mineral contaminated with some iron was 3.66, the specific gravity of pure kyanite being given in Dana's Textbook of Mineralogy as 3.6 to 3.7.

Example 12

Ten grams of alphanaphthol were mixed with 2 grams of cyanamide di-hydrochloride and 4 grams of nitro-benzene. The mixture was slowly heated to a temperature of about 130° C., after which it was kept within the range 130° to 140° C. for three hours with stirring. Subsequently the temperature was held at 150° C. for one hour. To the cooled reaction mixture (a dark brown liquid) were added 20 grams of benzene, after which the whole was treated three times with water to extract the soluble fraction. The resulting extract was evaporated to dryness over a water bath, leaving a dark greenish-brown crystalline residue, believed to be crude O-alphanaphthyl isourea hydrochloride. This was then made into a 2% aqueous solution.

In one test made with this reagent on minus 35-mesh deslimed Florida phosphate feed, it was capable by itself of bringing up quite a good froth of clean silica, when used at the rate of 17.5 lbs. of dissolved reaction product per ton of ore. In another test, however, very much better results were obtained on the same feed, when 5 lbs. of the dissolved reaction product were used along with 5 lbs. of kerosene, both per ton of ore. A strong froth was obtained and the floated silica was well flocculated.

The results of the second test were as follows:

|  | Percent weight | Percent B. P. L. | Percent distribution of B. P. L. |
|---|---|---|---|
| Head | 100.0 | 22.6 | 100.0 |
| Conc | 53.1 | 1.9 | 4.5 |
| Tail | 46.9 | 46.1 | 95.5 |

Example 13

The crude reaction product obtained in Example 4 with the material known as "Lorol" was here used in the form of an aqueous solution to treat a sample of minus 35-mesh deslimed Florida phosphate ore by flotation. A rougher float concentrate of silica was initially produced with an amount of the aqueous solution corresponding to 0.625 lb. of the crude reaction product dissolved therein per ton of ore. Retreatment of the rougher concentrate was then carried out, without further reagent addition, to yield a final concentrate of silica and a middling. The results were as follows:

|  | Percent weight | Percent B. P. L. | Percent ins. | Percent distribution of B. P. L. |
|---|---|---|---|---|
| Head | 100.0 | 26.5 |  | 100.0 |
| Conc | 66.3 | 4.4 | 94.2 | 11.0 |
| Midd | 12.7 | 48.8 | 41.7 | 23.4 |
| Tail | 21.0 | 82.6 | 1.9 | 65.6 |

When the amount of dissolved reagent was reduced to 0.5 lb. per ton of ore, the concentrate assayed 2.2%, the middling 26.4%, and the tailing 74.2% B. P. L., the head assaying 25.8%.

Example 14

Similar treatment of another sample taken from the same lot of phosphate ore, but with the "Lorol" reagent employed in alcoholic solution at the rate of 0.75 lb. per ton of ore, yielded the following results:

|  | Percent weight | Percent B. P. L. | Percent ins. | Percent distribution of B. P. L. |
|---|---|---|---|---|
| Head | 100.0 | 24.4 |  | 100.0 |
| Conc | 68.3 | 3.2 | 95.6 | 9.0 |
| Midd | 9.3 | 43.8 | 47.7 | 16.7 |
| Tail | 22.4 | 81.0 | 3.8 | 74.3 |

Example 15

Still another sample of the same lot of phosphate ore was treated with a 4% alcoholic solution containing 1 lb. of O-cetyl isourea hydrochloride per ton of ore, the circuit water being made acid with 10 lbs. of acetic acid, also per ton of ore. An excellent silica-carrying froth concentrate was taken off in a single operation, as can be seen from the following table:

|  | Percent weight | Percent B. P. L. | Percent ins. | Percent distribution of B. P. L. |
|---|---|---|---|---|
| Head | 100.0 | 24.5 |  | 100.0 |
| Conc | 66.25 | 0.9 | 98.3 | 2.5 |
| Tail | 33.75 | 70.9 | 15.7 | 97.5 |

In another test, sulphuric acid was used to acidify the pulp with rather poorer results, but a very clean silica froth concentrate was nevertheless obtained.

Example 16

The same O-cetyl isourea hydrochloride in alcohol solution was used to treat a further sample of the same lot of phosphate ore, but in this instance in a neutral circuit at the rate of 0.4 lb. per ton of ore. This yielded a rougher concentrate of silica which, with no further reagent addition, was cleaned once to give results as follows:

|  | Percent weight | Percent B. P. L. | Percent ins. | Percent distribution of B. P. L. |
|---|---|---|---|---|
| Head | 100.0 | 25.6 |  | 100.0 |
| Conc | 68.75 | 2.9 | 96.0 | 7.8 |
| Midd | 3.75 | 50.6 | 39.7 | 7.4 |
| Tail | 27.50 | 79.0 | 5.2 | 84.8 |

Example 17

The crude "Ocenol" reaction product of Example 8 was also found useful in treating Florida phosphate ore, the following results being obtained when this reagent was employed at the rate of 0.2 lb. per ton of ore:

|  | Percent weight | Percent B. P. L. | Percent distribution of B. P. L. |
|---|---|---|---|
| Head | 100.0 | 26.4 | 100.0 |
| Conc | 62.3 | 2.9 | 6.9 |
| Tail | 37.7 | 65.1 | 93.1 |

Example 18

O-normal-amyl isourea hydrochloride in 4% alcoholic solution was not only found to have the same selective properties as the higher alcohol derivatives, but was also found to exhibit excellent frothing properties capable, without loss of selectivity, of supplementing the less profuse bubble production of the higher alcohol derivatives.

In treating Florida phosphate ore, this reagent was found to be extremely selective for fine silica, though when used alone on this particular ore the weight floated was insufficient. When used with kerosene, the well-flocculated silica froth concentrate weighed 15.6% of the material treated, and consisted of practically pure SiO₂.

*Example 19*

Octadecyl alcohol was reacted with cyanamide and cyanamide di-hydrochloride, the mixture being carefully heated as before. The unpurified reaction product was used to treat Florida phosphate ore at the rate of 1 lb. per ton of ore. A very strong silica-bearing froth was removed, which was retreated twice without further reagent addition, the two middlings obtained being combined into one product. The results of the test were as follows:

|  | Percent weight | Percent B. P. L. | Percent ins. | Percent distribution of B. P. L. |
|---|---|---|---|---|
| Head | 100.0 | 27.85 |  | 100.0 |
| Conc | 66.1 | 3.3 | 95.5 | 7.8 |
| Midds | 8.0 | 54.0 | 35.7 | 15.5 |
| Tail | 25.9 | 82.5 | 2.0 | 76.7 |
| Midds. and tail, combined | 33.9 | 75.8 | 9.95 | 92.2 |

*Example 20*

A sample of Florida phosphate ore was here treated with O-octyl isourea hydrochloride purified by recrystallization from hot acetone in the form of white crystals containing 12.9% nitrogen (calculated for the pure compound, 13.4%). Three pounds of this reagent in the form of a 2% alcoholic solution were used along with 10 lbs. of carbon tetrachloride, both per ton of ore, to give a froth concentrate rich in silica, which was retreated with a further amount of the same alcoholic solution corresponding to 0.5 lb. of the dissolved purified O-octyl isourea hydrochloride per ton of ore, with the following results:

|  | Percent weight | Percent B. P. L. | Percent ins. | Percent distribution of B. P. L. |
|---|---|---|---|---|
| Head | 100.0 | 27.0 |  | 100.0 |
| Conc | 40.5 | 1.2 | 98.0 | 1.8 |
| Midd | 6.3 | 23.6 | 71.6 | 5.5 |
| Tail | 53.2 | 47.1 | 43.8 | 92.7 |

The effect of the carbon tetrachloride in this test was to speed up the flotation of the silica, though a parallel test without this collector the weights of the products were identical and their grades practically so.

*Example 21*

When unpurified O-octyl isourea hydrochloride in 4% alcoholic solution was used alone at the rate of 3 lbs. per ton of ore on a similar sample of Florida phosphate ore, the following results were obtained:

|  | Percent weight | Percent B. P. L. | Percent distribution of B. P. L. |
|---|---|---|---|
| Head | 100.0 | 25.82 | 100.0 |
| Conc | 50.0 | 2.55 | 4.9 |
| Midd | 10.3 | 22.05 | 8.8 |
| Tail | 39.7 | 56.10 | 86.3 |

*Example 22*

A sample of rhodochrosite ore from Butte, Montana, ground to pass 48-mesh and substantially deslimed, was treated by flotation for rejection of the manganese carbonate in the form of a tailing. The reagent used was the "Ocenol" reaction product of Example 8, in alcoholic solution. First this solution was added in amount corresponding to 1.6 lbs. of the dissolved reaction product per ton of ore. This yielded a first concentrate of silica, after which a second concentrate was removed with the solution used in a further amount corresponding to 0.8 lb. of the dissolved reaction product per ton of ore.

|  | Percent weight | Percent MnCO₃ | Percent ins. | Percent distribution of MnCO₃ |
|---|---|---|---|---|
| Head | 100.0 | 55.3 | 35.0 | 100.0 |
| 1st conc | 40.0 | 24.1 | 67.2 | 17.4 |
| 2nd conc | 23.5 | 68.1 | 21.4 | 28.8 |
| Tail | 36.5 | 81.7 | 8.4 | 53.8 |

*Example 23*

A sample of low-grade hematite ore with finely intercrystallized silica was ground to pass 65-mesh, deslimed, and tested by flotation with the crude "Ocenol" reaction product of Example 8. In alkaline circuit this reagent was found to have a definite selective action in favor of silica, while on acidifying the pulp the effect was reversed, the iron mineral being found to float in preference to the silica.

The crude "Lorol" reaction product of Example 4 showed similar tendencies in the treatment of this ore by flotation.

*Example 24*

A charge of Florida phosphate ore was stirred in a thick pulp with 2 lbs. of the "Ocenol" reaction product of Example 8, per ton of ore, and run on to a vanning plaque. The loosely agglomerated silica was concentrated in the usual manner by flowing over the edge of the plaque, while the non-flocculated or non-agglomerated phosphatic material remained on the plaque. With this material removed, the silica concentrate was put back on the plaque and in the same way retreated to yield a final silicious concentrate, the material which finally remained on the plaque constituting a middling. The results were as follows:

|  | Percent weight | Percent B. P. L. | Percent ins. | Percent distribution of B. P. L. |
|---|---|---|---|---|
| Head | 100.0 | 30.24 |  | 100.0 |
| Conc | 60.0 | 4.15 | 94.5 | 7.9 |
| Midd | 11.0 | 47.7 | 43.1 | 17.4 |
| Tail | 7.6 | 77.9 | 7.6 | 74.7 |

The concentrating procedures of this example correspond in physical aspect to wet tabling in which the lighter constituents of the material treated are collected as they flow over the bottom side of the table, substantially at right angles to the vibratory movement of the table.

*Example 25*

The reagent of the invention was O-cetyl isourea hydrochloride purified by double recrystallization from hot acetone. Another charge of Florida phosphate ore was subjected to flotation in the presence of 0.3 lb. of this reagent per ton of ore. This yielded a first float of silica, which was cleaned once making use of an additional amount of the same reagent of 0.1 lb. per ton of ore.

|  | Percent weight | Percent B. P. L. | Percent Ins. | Percent distribution of B. P. L. |
|---|---|---|---|---|
| Head | 100.0 | 27.9 | | 100.0 |
| Conc | 57.5 | 3.3 | 95.5 | 6.8 |
| Midd | 9.8 | 22.3 | 73.1 | 7.8 |
| Tail | 32.7 | 73.0 | 12.0 | 85.4 |

Example 26

This test was carried out on a minus 28-mesh deslimed Florida phosphate feed different in regard to the phosphate rock contained from any used in the preceding examples dealing with phosphate ore. A sample of this feed was subjected to flotation in the presence of crude O-nonyl isourea hydrochloride used in alcoholic solution at the rate of 4 lbs. per ton of ore. This yielded a first float of silica, which was cleaned once without further reagent addition. The results of this test were as follows:

|  | Percent weight | Percent B. P. L. | Percent Ins. | Percent distribution of B. P. L. |
|---|---|---|---|---|
| Head | 100.0 | 30.1 | 62.2 | 100.0 |
| Conc | 52.2 | 0.7 | 97.2 | 1.2 |
| Midd | 9.3 | 32.7 | 59.1 | 10.2 |
| Tail | 38.5 | 69.4 | 15.4 | 88.6 |

The type of phosphate ore which was used in this example is known to us to be much less amenable to treatment by known flotation processes than any which was used in examples previously described.

Example 27

Crude O-cetyl isourea hydrochloride, in 4% alcoholic solution, was used at the rate of 0.35 lb. per ton of ore to float the silica away from another sample of the same feed as in Example 26, retreatment of the concentrate initially obtained being carried out without further reagent addition.

|  | Percent weight | Percent B. P. L. | Percent Ins. | Percent distribution of B. P. L. |
|---|---|---|---|---|
| Head | 100.0 | 31.5 | | 100.0 |
| Conc | 53.9 | 1.6 | 96.1 | 2.8 |
| Midd | 6.6 | 44.6 | 45.0 | 9.0 |
| Tail | 39.5 | 70.4 | 13.0 | 88.2 |

Example 28

The material tested was an iron-stained barite ore from Georgia, containing silica as a principal impurity. It was found that better flotation results were obtained on this ore with fairly close sizing. Thus a sample passing a 65-mesh screen and retained on a 100-mesh screen was treated with 2.4 lbs. of O-octadecyl isourea hydrochloride and 1.6 lbs. of the "Ocenol" reaction product of Example 8, both per ton of ore, to give a rougher float concentrate relatively rich in silica and a tailing high in barium sulphate, the rougher concentrate being retreated once, without further reagent addition, to give a finished silica concentrate and a middling. The values of the various products were then estimated from their specific gravities. The figures for $BaSO_4$ in the table below are therefore only approximate, being calculated from the densities of barite and quartz as given in reference books.

|  | Percent weight | Sp. gr. | Percent $BaSO_4$ | Percent distribution of $BaSO_4$ |
|---|---|---|---|---|
| Head | 100.0 | 4.01 | 81.1 | 100.0 |
| Conc | 25.0 | 3.26 | 47.0 | 14.5 |
| Midd | 9.0 | 4.25 | 92.4 | 85.5 |
| Tail | 66.0 | 4.25 | 92.4 | |

Example 29

Another barite ore, ground to pass 100-mesh and deslimed, was here tested with O-dodecyl isourea hydrochloride used at the rate of 0.5 lb. per ton of ore, the procedures of the test being otherwise the same as in Example 28. A final concentrate was obtained assaying 44.5% $BaSO_4$, the unfloated residue assaying 95.1% $BaSO_4$. There was a heavy middling, which appeared to be in proper condition for return to the mill circuit in continuous work. The head ran 61.6% $BaSO_4$, the indicated recovery of barite in the unfloated residue being 49%.

Example 30

Two tests carried out with O-cetyl isourea are described below particularly for the purpose of illustrating the degree of pulp consistency to be used for reagent admixture when the reagent of the invention is with difficulty soluble in water.

Each of the two tests was carried out on Florida phosphate feed with the O-cetyl isourea employed in 4% alcoholic solution.

In the first test, the reagent was first added to a thick pulp of the ore in the amount of 0.2 lb. per ton of ore. The pulp was then diluted in a flotation machine to a pulp density of about four to one, to which more reagent was added at the rate of 0.8 lb. per ton of ore. This added amount of the reagent did not mix satisfactorily in the diluted pulp. The float concentrate weighed only about 24% of the feed, though it it consisted of very high grade silica.

In the second test, the reagent in the amount of 0.9 lb. per ton of ore was observed to mix satisfactorily in a one to one pulp of the ore. When frothing was later carried out, however, this quantity of reagent was found to have been in considerable excess of the actual amount required.

Retreatment without further reagent addition was carried out in the second test, the results of which were as follows:

|  | Percent weight | Percent B. P. L. | Percent distribution of B. P. L. |
|---|---|---|---|
| Head | 100.0 | 28.5 | 100.0 |
| Conc | 73.9 | 10.3 | 26.6 |
| Midd | 6.2 | 75.4 | 16.3 |
| Tail | 19.9 | 81.7 | 57.1 |

Example 31

O-cetyl isourea sulphate was made into a 1.33% solution in ordinary alcohol. A sample of Florida phosphate feed was subjected to froth flotation in the presence of this solution used in amount corresponding to 1 lb. of the dissolved sulphate per ton of ore. This yielded a good froth float rich in silica, which was retreated once, without further reagent addition, to give a final silica concentrate and a middling. The results of the test were as follows:

|  | Percent weight | Percent B. P. L. | Percent distribution of B. P. L. |
|---|---|---|---|
| Head | 100.0 | 27.9 | 100.0 |
| Conc | 62.1 | 1.9 | 4.2 |
| Midd | 3.7 | 51.8 | 6.9 |
| Tail | 34.2 | 72.4 | 88.9 |

The rougher and final concentrates of silica obtained in this test were observed to be strongly flocculated with air, it being quite apparent that they could also have been efficiently separated by such methods as tabling.

Example 32

The selective properties of the reagents of the invention are well illustrated by the following test on magma copper ore containing both copper and iron sulphides.

A sample of this ore, of a particle size to pass 65-mesh and largely (but not completely) deslimed, was subjected to flotation in the presence of 2 lbs. of O-octadecyl-isourea hydrochloride per ton of ore, the circuit water being made alkaline with 2.5 lbs. of caustic soda, also per ton of ore. This yielded a rougher concentrate which, upon retreatment, yielded a first finished concentrate and a middling, a second finished concentrate being obtained by adding a further 1.5 lbs. of O-octadecyl-isourea hydrochloride per ton of ore to the residue of the first operation. The results of the test are shown in the following table, it being particularly noted that the rejection of insolubles in the first concentrate was quite substantial:

|  | Percent weight | Percent Cu | Percent Fe | Percent ins. | Percent distribution Cu | Percent distribution Fe |
|---|---|---|---|---|---|---|
| Head | 100.0 | 6.64 | 22.25 |  | 100.0 | 100.0 |
| 1st conc | 22.9 | 9.68 | 39.2 | 3.2 | 33.5 | 40.3 |
| Midd | 12.9 | 11.20 | 32.0 |  | 21.8 | 18.5 |
| 2nd conc | 16.9 | 10.40 | 32.8 | 16.5 | 26.5 | 24.0 |
| Tail | 47.3 | 2.54 | 8.0 |  | 18.2 | 17.0 |

In neutral circuit a definite selection of sulphides over gangue was accomplished with O-nonyl isourea hydrochloride, while in acid circuit a similar result was obtained with the "Ocenol" reaction product of Example 8.

Example 33

O-cetyl isourea acetate was found to be an excellent reagent in separating silica out of Florida phosphate ore by froth flotation.

A substantially deslimed sample of such ore, of a particle size finer than 35-mesh, was treated in a subaeration flotation machine with 0.4 lb. of O-cetyl isourea acetate per ton of ore to give a rough froth concentrate of silica and a tailing carrying most of the phosphate values. With this tailing removed, the concentrate was retreated in the same machine with a further 0.1 lb. of O-cetyl isourea acetate per ton of original ore to give a finished concentrate of silica and a middling. The results were as follows:

|  | Percent weight | Percent B. P. L. | Percent ins. | Percent distribution of B. P. L. |
|---|---|---|---|---|
| Head | 100.0 | 29.0 |  | 100.0 |
| Conc | 61.9 | 2.2 | 96.8 | 4.7 |
| Midd | 4.5 | 27.7 | 66.7 | 4.3 |
| Tail | 33.6 | 78.5 | 6.7 | 91.0 |

Example 34

A sample of kyanite ore, ground to pass 35-mesh and substantially deslimed, was treated by flotation with 0.2 lb. of O-cetyl isourea acetate per ton of ore. This gave a very strong heavy froth of silica, leaving a tailing consisting principally of the kyanite mineral. The concentrate was retreated twice, making use of a total of 0.1 lb. more of O-cetyl isourea acetate per ton of original ore, to give a final concentrate which, though consisting largely of free silica, could have been improved by still further treatment. The two middlings obtained were combined into one product as indicated in the following table:

|  | Percent weight | Percent kyanite |
|---|---|---|
| Head | 100.0 | 36.7 |
| Conc | 59.3 | 17.5 |
| Midds | 28.0 | 54.8 |
| Tail | 12.7 | 86.3 |

The middlings were agitated with a further 3 lbs. of O-cetyl isourea acetate and with 8 lbs. of kerosene, both per ton of original ore. A considerable part of the kyanite became agglomerated and, though rather too heavy to be easily recovered by froth flotation, was in excellent condition for recovery on a wet table or the like.

Example 35

Crude O-dodecyl isourea hydrochloride made by reacting lauryl alcohol with cyanamide and cyanamide di-hydrochloride was purified by recrystallization, nitrogen determinations on two samples of the purified product giving 10.68% and 10.45% nitrogen, respectively (calculated for the pure compound, 10.58%).

This purified product was used to treat a sample of Florida phosphate feed, of a particle size to pass 35-mesh and substantially deslimed, in a neutral circuit at the rate of 0.5 lb. per ton of ore with the results indicated in the following table, retreatment of the silica concentrate being carried out with no further reagent addition:

|  | Percent weight | Percent B. P. L. | Percent distribution of B. P. L. |
|---|---|---|---|
| Head | 100.0 | 24.05 | 100.0 |
| Conc | 60.5 | 1.2 | 3.0 |
| Midd | 8.9 | 19.9 | 7.4 |
| Tail | 30.6 | 69.0 | 89.6 |

Example 36

The reagent of the invention was crude O-cetyl isourea hydrochloride. This impure compound containing 26 carbon atoms in the substituted radical was found to be less easily soluble than the lower compounds of the preceding examples. Excellent results were nevertheless obtained with this high-molecular-weight reagent as follows:

A 1% solution of the reagent in warm alcohol was prepared. A one to one warm pulp of phosphate feed was agitated for a few seconds with an amount of this warm solution corresponding to 0.5 lb. of the crude O-cetyl isourea hydrochloride dissolved therein per ton of ore, after which it was diluted with hot water at a temperature of 60° C. In this state it was then subjected to flotation, with the result that an excellent silica-bearing froth was removed. Retreatment of this froth, without further reagent addition, gave a concentrate of nearly pure silica, the tailing of this cleaning operation constituting a middling. The following results were obtained:

|  | Percent weight | Percent B. P. L. | Percent ins. | Percent distribution of B. P. L. |
|---|---|---|---|---|
| Head | 100.0 | 29.4 | | 100.0 |
| Conc | 43.9 | 0.9 | 96.3 | 1.3 |
| Midd | 19.5 | 14.1 | 82.8 | 9.3 |
| Tail | 36.6 | 69.0 | 18.0 | 89.4 |

When the warm solution of the reagent was used in amount corresponding to 1 lb. of dissolved reagent per ton of ore, the froth carried too much phosphate (12.5% B. P. L.), but the tailing contained 80.6% B. P. L., the B. P. L. recovery therein being 65%.

*Example 37*

A mixture was made consisting of glass and synthetic resin, each of these constituents being of a particle size to pass about 28-mesh. This was treated in an aqueous pulp with a small amount of the crude "Lorol" reaction product of Example 4. It was observed that the glass was preferentially flocculated and, with a little more of the same reagent, agglomerated. A very good separation of the two constituents of the mixture was made by froth flotation, but could also have been efficiently carried out by table treatment.

It is understood that the invention is in no way limited to the procedures of the foregoing examples, which procedures may be modified in various ways, as well as combined with known procedures in the art.

The term "ore" employed in the claims is intended to cover ores, minerals, and the like.

What is claimed is:

1. In a process of ore concentration, the step comprising subjecting the ore in aqueous pulp to a concentrating operation in the presence of a reagent selected from the class consisting of compounds of the general formulae $H_2N.C(OR):NH$ and $[H_2N.C(OR):NH.H]_nX$, in which two formulae the symbol R has reference to the hydrocarbon residue of an organic hydroxy compound, the symbol X and multiplier $n$ of the second formula respectively appertaining to the anion of a substantially water-soluble acid and to a whole number equal to the valence of the acid anion X.

2. In a process of ore concentration, the step comprising subjecting the ore in aqueous pulp to a concentrating operation in the presence of a reagent selected from the class consisting of compounds of the general formulae $H_2N.C(OR):NH$ and $[H_2N.C(OR):NH.H]_nX$, in which two formulae the symbol R has reference to the hydrocarbon residue of a straight-chain aliphatic alcohol, the symbol X and multiplier $n$ of the second formula respectively appertaining to the anion of a substantially water-soluble acid and to a whole number equal to the valence of the acid anion X.

3. In a process of ore concentration, the step comprising subjecting the ore in aqueous pulp to a concentrating operation in the presence of a reagent selected from the class consisting of compounds of the general formulae $H_2N.C(OR):NH$ and $[H_2N.C(OR):NH.H]_nX$, in which two formulae the symbol R has reference to a straight-chain hydrocarbon group containing at least five carbon atoms, the symbol X and multiplier $n$ of the second formula respectively appertaining to the anion of a substantially water-soluble acid and to a whole number equal to the valence of the acid anion X.

4. In a process of ore concentration, the step comprising subjecting the ore in aqueous pulp to a concentrating operation in the presence of an organic-substituted isourea compound in which the substituted group is attached to oxygen and consists of the hydrocarbon residue of an organic hydroxy compound.

5. In a process of ore concentration, the step comprising subjecting the ore in aqueous pulp to a concentrating operation in the presence of a salt with a substantially water-soluble acid of an organic-substituted isourea in which the substituted group is a straight-chain hydrocarbon group attached to oxygen.

6. In a process of ore concentration, the step comprising subjecting the ore in aqueous pulp to a concentrating operation in the presence of the hydrochloric acid salt of an organic-substituted isourea in which the substituted group is a straight-chain hydrocarbon group attached to oxygen.

7. In a process of ore concentration, the step comprising subjecting the ore in aqueous pulp to a concentrating operation in the presence of a reagent consisting of the crude reaction mixture obtained by reacting an alcohol with cyanamide and cyanamide dihydrochloride.

8. In a process of ore concentration, the step comprising subjecting the ore in aqueous pulp to a concentrating operation in the presence of a reagent consisting of the crude reaction mixture obtained by reacting a commercial mixture of aliphatic alcohols with cyanamide and cyanamide dihydrochloride.

9. In a process of ore concentration, the step comprising subjecting the ore in aqueous pulp to a concentrating operation in the presence of a reagent containing a plurality of organic-substituted isourea compounds having a straight-chain hydrocarbon group attached to oxygen as their substitutent.

10. A process of concentrating phosphate minerals from their ores containing silicious gangue, which comprises admixing an aqueous pulp of suitably divided particles of such an ore with a reagent selected from the class consisting of compounds of the general formulae $H_2N.C(OR)NH$ and $[H_2N.C(OR):NH.H]_nX$, in which two formulae the symbol R has reference to the hydrocarbon residue of an organic hydroxy compound, the symbol X and multiplier $n$ of the second formula respectively appertaining to the anion of a substantially water-soluble acid and to a whole number equal to the valence of the acid anion X, said admixture causing a selective surface modification of the silicious gangue particles; and effecting a separation of these particles from the phosphate mineral particles.

11. A process of concentrating phosphate minerals from their ores containing silicious gangue, which comprises admixing an aqueous pulp of suitably divided particles of such an ore with an organic-substituted isourea compound in which the substituted group is attached to oxygen and consists of the hydrocarbon residue of a straight-chain aliphatic alcohol of more than four carbon atoms, said admixture causing a selective surface modification of the silicious gangue particles; and effecting a separation of these particles from the phosphate mineral particles.

12. A process of concentrating phosphate minerals from their ores containing silicious gangue, which comprises admixing an aqueous pulp of suitably divided particles of such an ore with an organic-substituted isourea compound in which the substituted group is attached to oxygen and consists of the hydrocarbon residue of a straight-chain aliphatic alcohol of more than four carbon atoms, together with a cooperating reagent consisting of a non-frothing water-immiscible organic liquid, to selectively modify the surfaces of the silicious gangue particles; and effecting a separation of these particles from the phosphate mineral particles.

13. In a process of ore concentration, the step comprising subjecting the ore in aqueous pulp to a concentrating operation in the presence of an organic-substituted isourea compound in which the substituted group is attached to oxygen and consists of the hydrocarbon residue of lauryl alcohol.

14. In a process of ore concentration, the step comprising subjecting the ore in aqueous pulp to a concentrating operation in the presence of an organic-substituted isourea compound in which the substituted group is attached to oxygen and consists of the hydrocarbon residue of cetyl alcohol.

15. In a process of ore concentration, the step comprising subjecting the ore in aqueous pulp to a concentrating operation in the presence of an organic-substituted isourea compound in which the substituted group is attached to oxygen and consists of the hydrocarbon residue of oleyl alcohol.

16. In a process of ore concentration, the step comprising subjecting the ore in aqueous pulp to a concentrating operation in the presence of a reagent selected from the class consisting of compounds of the general formulae $H_2N.C(OR):NH$ and $[H_2N.C(OR):NH.H]_nX$, in which two formulae the symbol R has reference to the hydrocarbon residue of an organic hydroxy compound, the symbol X and multiplier $n$ of the second formula respectively appertaining to the anion of a substantially water-soluble acid and to a whole number equal to the valence of the acid anion X, said concentrating operation being also carried out in the presence of a cooperating reagent consisting of a non-frothing water-immiscible organic liquid.

17. A process of concentration comprising treating an aqueous pulp of suitably divided particles of an ore with a reagent selected from the class consisting of organic-substituted isoureas of the type having a hydrocarbon group attached to oxygen as their substituent and the salts of these organic-substituted isoureas with acids substantially soluble in water, subjecting the aqueous pulp to a flotation concentration operation, and separating the floated particles of the ore from the remainder of the pulp.

18. A process of concentration comprising treating an aqueous pulp of suitably divided particles of an ore with a reagent selected from the class consisting of organic-substituted isoureas of the type having a hydrocarbon group attached to oxygen as their substituent and the salts of these organic-substituted isoureas with acids substantially soluble in water, together with a cooperating reagent consisting of a non-frothing water-immiscible organic liquid; subjecting the aqueous pulp to a flotation concentration operation; and separating the floated particles of the ore from the remainder of the pulp.

19. A process of concentration comprising treating an aqueous pulp of suitably divided particles of an ore with a reagent selected from the class consisting of organic-substituted isoureas of the type having a hydrocarbon group attached to oxygen as their substituent and the salts of these organic-substituted isoureas with acids substantially soluble in water, to effect a selective agglomeration of certain particles of the ore; and separating these particles from the remainder of the pulp by wet gravity concentration.

20. A process of concentration comprising treating an aqueous pulp of suitably divided particles of an ore with a reagent selected from the class consisting of organic-substituted isoureas of the type having a hydrocarbon group attached to oxygen as their substituent and the salts of these organic-substituted isoureas with acids substantially soluble in water, together with a cooperating reagent consisting of a non-frothing water-immiscible organic liquid, to effect a selective agglomeration of certain particles of the ore; and separating these particles from the remainder of the pulp by wet gravity concentration.

21. A process of concentrating phosphate minerals from their ores containing silicious gangue, which comprises admixing an aqueous pulp of suitably divided particles of such an ore with a reagent selected from the class consisting of organic-substituted isoureas having a straight-chain hydrocarbon group of more than eight carbon atoms attached to oxygen as their substituent and the salts of these organic-substituted isoureas with acid substantially soluble in water, to selectively modify the surfaces of the silicious gangue particles; and effecting a separation of these particles from the phosphate mineral particles.

22. A process of concentrating kyanite minerals from their ores containing silicious gangue, which comprises admixing an aqueous pulp of suitably divided particles of such an ore with a reagent selected from the class consisting of compounds of the general formulae $H_2N.C(OR):NH$ and $[H_2N.C(OR):NH.H]_nX$, in which two formulae the symbol R has reference to the hydrocarbon residue of an organic hydroxy compound, the symbol X and multiplier $n$ of the second formula respectively appertaining to the anion of a substantially water-soluble acid and to a whole number equal to the valence of the acid anion X, said admixture causing a selective surface modification of the silicious gangue particles; and effecting a separation of these particles from the kyanite mineral particles.

23. A process of concentrating kyanite minerals from their ores containing silicious gangue, which comprises admixing an aqueous pulp of suitably divided particles of such an ore with an organic-substituted isourea compound having a straight-chain hydrocarbon group of more than four carbon atoms attached to oxygen as its substituent, together with a cooperating reagent consisting of a non-frothing water-immiscible organic liquid, to selectively modify the surfaces of the silicious gangue particles; and effecting a separation of these particles from the kyanite mineral particles.

24. A process of concentrating kyanite minerals from their ores containing silicious gangue, which comprises admixing an acidified aqueous pulp of suitably divided particles of such an ore with a reagent selected from the class consisting of organic-substituted isoureas having a straight-chain hydrocarbon group of at least five carbon atoms attached to oxygen as their substituent and the salts of these organic-substituted isoureas with acids substantially soluble in water, to selectively modify the surfaces of the kyanite mineral particles; and effecting a separation of these particles from the silicious gangue particles.

25. In a process of concentrating sulphide minerals from their ores containing silicious gangue, the step comprising subjecting an aqueous pulp of suitably divided particles of such an ore to a concentrating operation in the presence of a reagent selected from the class consisting of compounds of the general formulae $H_2N.C(OR):NH$ and $[H_2N.C(OR):NH.H]_nX$, in which two formulae the symbol $R$ has reference to the hydrocarbon residue of an organic hydroxy compound, the symbol $X$ and multiplier $n$ of the second formula respectively appertaining to the anion of a substantially water-soluble acid and to a whole number equal to the valence of the acid anion $X$.

WILLIAM TROTTER.
ELTOFT WRAY WILKINSON.

CERTIFICATE OF CORRECTION.

Patent No. 2,205,503.  June 25, 1940.

WILLIAM TROTTER, ET AL.

It is hereby certified that error appears in the printed specification of the above numbered patent requiring correction as follows: Page 1, second column, line 33, for the word "these" read --those--; page 2, second column, line 74, for "or" read --ore--; page 6, first column, line 54, after "though" insert --in--; page 8, second column, lines 56 and 67, for "O-cetyl" read --O-ceryl--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents